United States Patent [19]

Planchon

[11] Patent Number: 5,295,426
[45] Date of Patent: Mar. 22, 1994

[54] SLOT STARTING SAWING METHOD AND APPARATUS

[76] Inventor: Paul O. Planchon, 2580 Melody La., Reno, Nev. 89512

[21] Appl. No.: 898,478

[22] Filed: Jun. 15, 1992

[51] Int. Cl.⁵ .............................................. B27B 33/02
[52] U.S. Cl. ...................................... 83/846; 83/697; 83/853; 30/392
[58] Field of Search ................. 83/835, 837, 846, 847, 83/848, 853, 13, 697, 851; 30/392, 503, 503.5, 353, 355, 356, 357; D8/20, 70

[56] References Cited

U.S. PATENT DOCUMENTS

| | | | |
|---|---|---|---|
| 119,678 | 10/1871 | White | 83/837 |
| 2,141,504 | 12/1938 | Balfour et al. | 83/848 |
| 2,636,267 | 4/1953 | Whitcomb | 30/357 |
| 2,646,094 | 7/1953 | Russell | 83/846 |
| 3,033,251 | 5/1962 | Atkinson et al. | 83/835 |
| 3,097,430 | 7/1963 | Lewinski et al. | 30/392 |
| 3,680,610 | 8/1972 | Lindgren | 83/835 |

Primary Examiner—Eugenia Jones
Assistant Examiner—Allan M. Schrock
Attorney, Agent, or Firm—Herbert C. Schulze

[57] ABSTRACT

A method and apparatus for practicing the method by which a reciprocating saw may be utilized to cut within the edges of a panel of material without the necessity of providing a pilot hole or the like for the saw blade, wherein the saw blade is configured in such manner as to taper at the end not attached to the saw motor in order to come to a point and wherein a knife edge is supplied along the edges of said tapered portion of said saw blade, wherein the saw blade at its pointed and tapered end is allowed to cut through the panel of material being sawed with the sawing action commencing immediately after full penetration of the blade through the material.

3 Claims, 3 Drawing Sheets

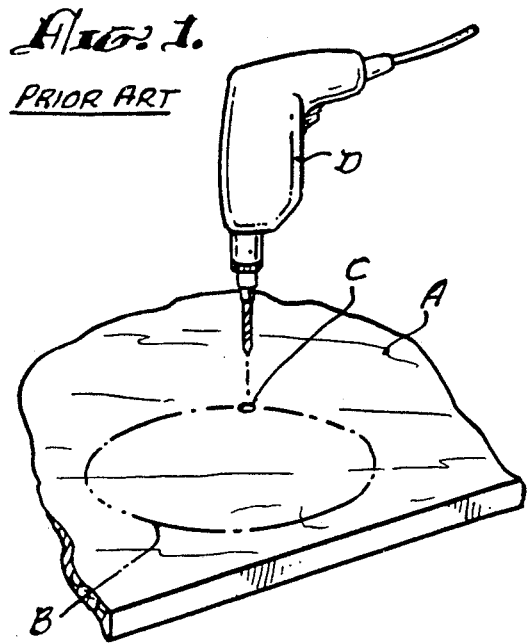
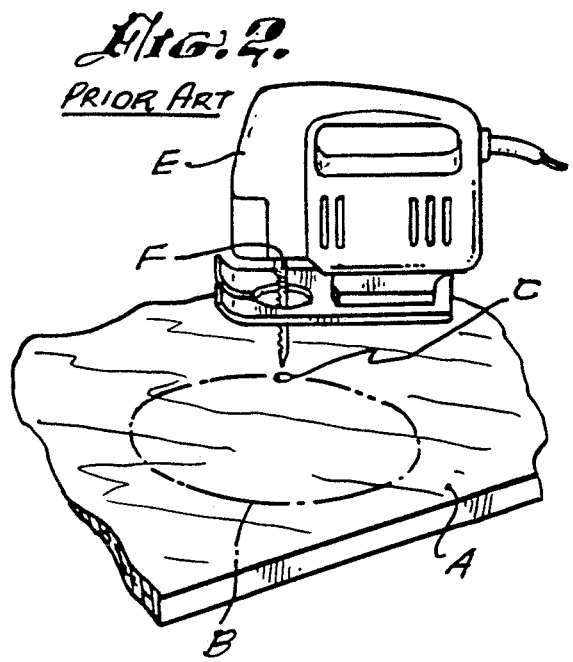
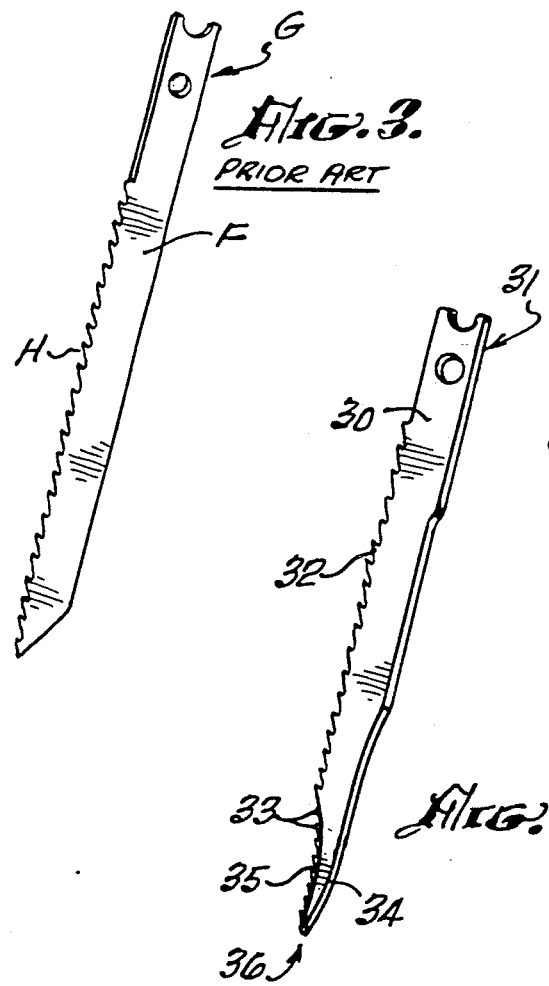
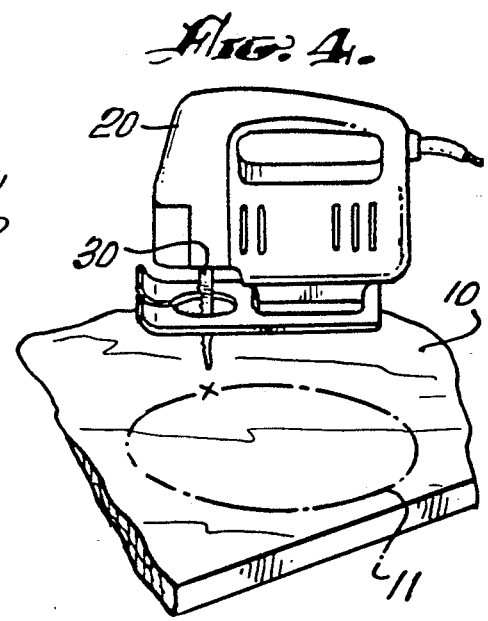

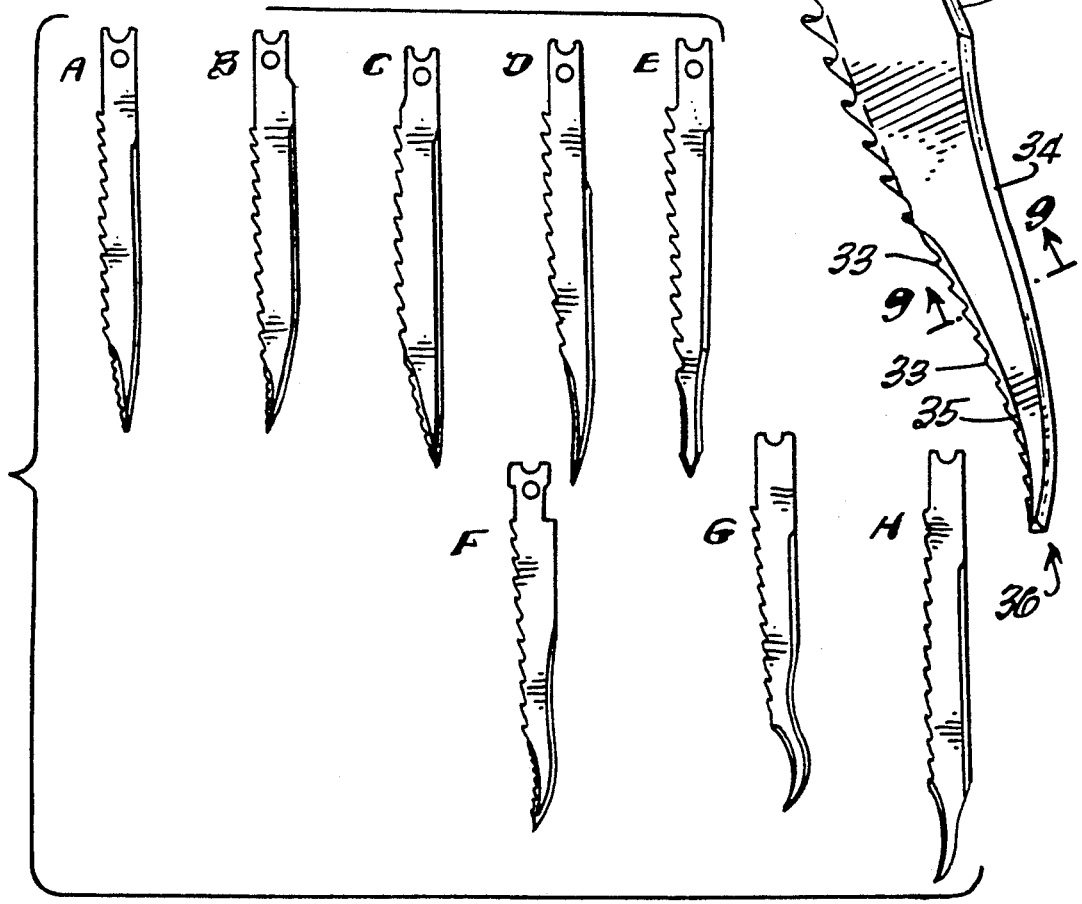

SLOT STARTING SAWING METHOD AND APPARATUS

CROSS-REFERENCE TO RELATED PATENT APPLICATIONS

This patent application is related to my previously filed design patent application on SLOT STARTING SAWING BLADE, Ser. No. 07/822,561, now abandoned, and is related to my design patent application on SLOT STARTING SAWING BLADE being filed concurrently herewith.

BACKGROUND OF THE INVENTION

1. Field of the Invention

This invention is in the general field of sawing;

The invention is more particularly in the field of sawing with reciprocating blade saws, such as saber saws, Jig saws, and the like;

The invention is even more particularly directed to a method and apparatus by which such reciprocating blade saws may be utilized to cut designs or the like in the center, or within the borders of, a panel of material being sawed without the necessity of drilling a pilot hole or the like in which the saw commences the sawing action.

2. Description of the Prior Art

There is no prior art known to me by which a reciprocating blade saw, such as a saber saw or the like can be utilized to cut a design within a panel of material and without the necessity of drilling a pilot hole or the like for the saw blade to commence sawing.

SUMMARY OF THE INVENTION

Reciprocating blade saws such as Jig saws, saber saws and the like are in wide use. Particularly such saws are widely used for cutting material from a panel where the sawing does not penetrate through the edge of the panel.

In such sawing it is customary to drill or punch a hole in the material being sawed in order to provide a position for the saw blade to commence its cutting. The necessity of drilling such a hole, normally called a pilot hole, creates additional work for the person doing the sawing and requires an additional tool such as a drill or a punch.

I have now developed a method and an apparatus for practicing the method whereby a reciprocating blade saw may be caused to penetrate through a panel of material and to be used to saw out whatever material is desired to be sawed out of the panel without the necessity of providing a pilot hole or the like for a starting point for the saw blade.

I have accomplished this highly desirable end by forming special reciprocating blades wherein the blades have a knife like shape and terminate in a thin, narrow, tool end which easily slices through a panel of material being sawed.

After the saw blade has sliced through the material then the saw continues in a normal sawing action to remove whatever material is desired to be removed from within the panel.

It is an object of this invention to provide a method and apparatus by which a panel of material may be penetrated by a saw blade without drilling or otherwise provide a pilot hole;

Another object of this invention is to provide a method and apparatus by which a reciprocating saw may be utilized to commence a cut within a panel of material and conclude the cut within a panel of material with no necessity of providing an initial starting pilot hole for the saw blade.

The foregoing and other objects and advantages of this invention will become apparent to those skilled in the art upon reading the description of a preferred embodiment which follows in conjunction with a review of the appended drawings.

BRIEF DESCRIPTION OF THE DRAWINGS

FIG. 1 is a perspective of a panel of material requiring a large cut out hole showing the drilling of a pilot hole for a saw blade;

FIG. 2 is a saw blade actually being inserted into the pilot hole in the panel;

FIG. 3 is a conventional blade such as the blade being used in FIG. 2;

FIG. 4 shows a similar cut about to be made in a panel of material using the method and apparatus of this invention;

FIG. 5 shows the saw blade being used in the method of this invention;

FIG. 6 is perspective of a specially formed reciprocating saw blade to be used in practicing the method of this invention;

FIG. 7 is a section on 7—7 of FIG. 6;

FIG. 8 is a section on 8—8 of FIG. 6;

FIG. 9 is a section on 9—9 of FIG. 6;

FIG. 10 illustrates a number of variations of the configuration of saw blades which can be utilized in practicing the method of this invention.

DESCRIPTION OF A PREFERRED EMBODIMENT

Figure 11:
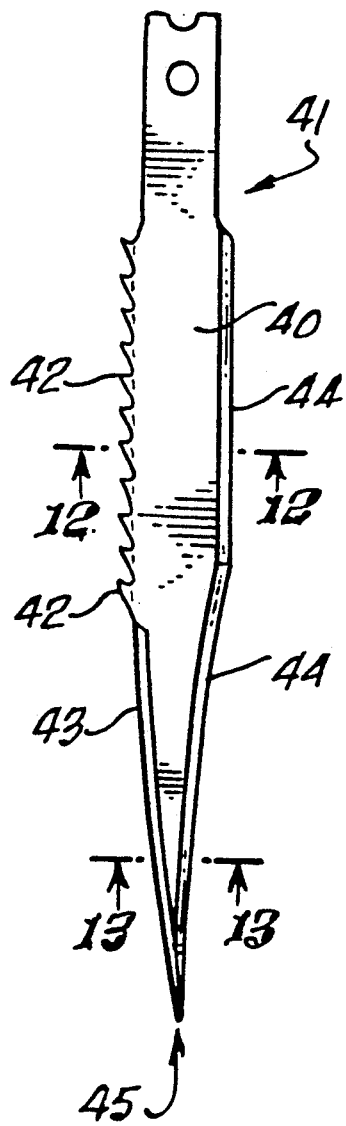
FIG. 11 is a side elevation of a particular embodiment of a blade to practice the method of this invention.

FIGS. 1, 2 and 3 illustrate the prior art in making a cut within a panel of material using a reciprocating blade saw. FIG. 1 shows a panel A with the design B to be cut, and a drill D having drilled a pilot hole C in the panel. In FIG. 2 a saw blade edge carried by saw motor arrangement E is being inserted within the pilot hole C. FIG. 3 shows a customary reciprocating saw blade F having means G to attach to the motor and having saw teeth at H.

FIG. 4 shows a panel 10 with a design to be cut 11 and a reciprocating saw motor and housing 20 with a blade 30, suitable to practice the method of this invention, in place ready to commence the cut without the use of a pilot hole.

The blade 30 is illustrated in FIG. 5 with arrangement to attach to the saw motor at 31, saw teeth 32 and gradually diminishing saw teeth 33. The blade is slightly curved and tapers to a point at 36 as indicated. Saw teeth 33 gradually diminish in size and they are also formed into blade like elements as shown more particularly in FIG. 6. Likewise the back side of this tapering portion of the blade and additional portions of the blade are formed into a knife edge at 34. Blade 30 is shown in more detail in the enlarged FIG. 6.

The sectional view FIG. 7 shows teeth at 32 and a regular saw blade body 30.

The sectional view FIG. 8 shows still the conventional teeth 32 but with a sharp knife edge at 34 on the edge opposing the teeth.

FIG. 9 shows the diminished dimension teeth 33 being sharpened into a knife edge at 35 and the other edge being a knife edge 34.

FIG. 10 illustrates a number of different blades utilizing the principles of this invention some of which are more desirable for particular materials than others. Experimentation will reveal the best configuration of the blade for various materials. In each case there will be a main body portion of the saw blade with customary teeth over a major portion of its length with the blade then tapering and with a knife edge applied as indicated for starting purposes.

Figure 12:
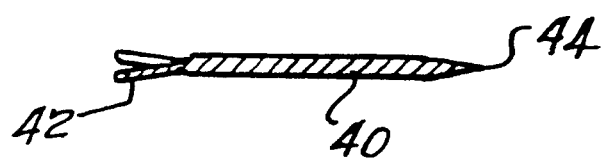
FIG. 12 is a section on 12—12 of FIG. 11.
Figure 13:
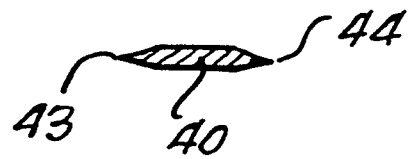
FIG. 13 is a section on 13—13 of FIG. 11.

In FIGS. 11, 12, and 13 I have particularly illustrated one blade which I find extremely fine to use with certain types of materials such as plastics and the like. This blade 40 has customary has customary mounting arrangements 41 and customary teeth 42 as indicated.

This saw blade 40 is, however, quite different in other respects. It will be noted that where the customary teeth end, there are no other teeth but there is a knife edge 43 extending from the last tooth 42 and the knife edge on the other edge extending the entire length of the saw blade except for the portion where the blade is mounted.

In operation, the blade mounted upon the saw motor is placed lightly upon a position on the surface of the material being cut and the reciprocating action is commenced. The tip of the blade is allowed to gradually penetrate. The blade penetrates quite quickly and without any particular pressure. As soon as the blade has penetrated completely into the panel, the normal sawing action takes place with the saw tooth portion of the blade.

While the embodiments of this invention shown and described are fully capable of achieving the objects and advantages desired, such embodiments are shown for purposes of illustration only and not for purposes of limitation.

I claim:

1. A saw blade comprising: an elongate member of suitable saw blade material having a width, length, thickness, a first leading edge, a second trailing edge, a first end and a second end; said first end being provided with means to connect to a reciprocating mechanism; said first leading edge having saw teeth extending from said second end to a first position adjacent the means to connect to a reciprocating mechanism, wherein said saw teeth are of uniform size from said first position to a second position intermediate the first position and the second end; said saw teeth gradually diminish in size from said second position to the second end; said second trailing edge being stepped so the width of the saw blade is decreased at a third position intermediate the first and second ends, said decreased width being continued to a fourth position intermediate the third position and the second end; the width of the saw blade being tapered from the fourth position to the second end in such manner as to create a sharp point at the second end; said second trailing edge being tapered to a knife edge along its length from the third position to the sharp point; and the first leading edge and the saw teeth thereon being tapered to a knife edge from the second position to the sharp point.

2. The apparatus of claim 1 wherein the first leading edge from the second position to the sharp point is concave.

3. The apparatus of claim 2 wherein the second trailing edge is convex from the sharp point to a location intermediate the sharp point and the fourth position and concave from the location to the fourth position.

* * * * *